Jan. 23, 1945. H. R. RICARDO 2,367,963
TWO-CYCLE SLEEVE VALVE ENGINE
Filed June 11, 1943  3 Sheets-Sheet 1
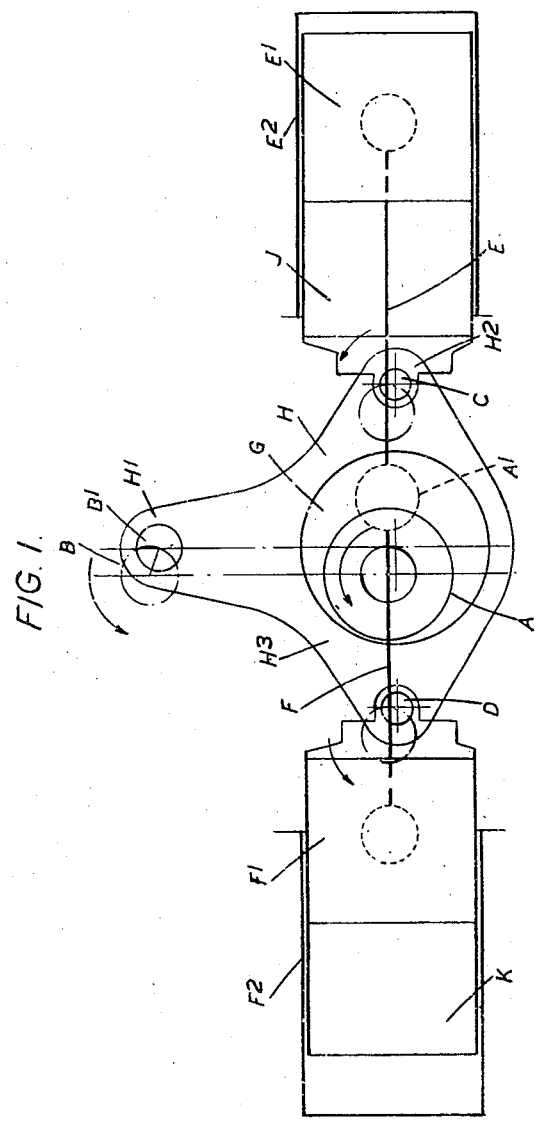
Inventor
Harry R. Ricardo
By
Watson, Cole, Grindle a Watson
Attorneys

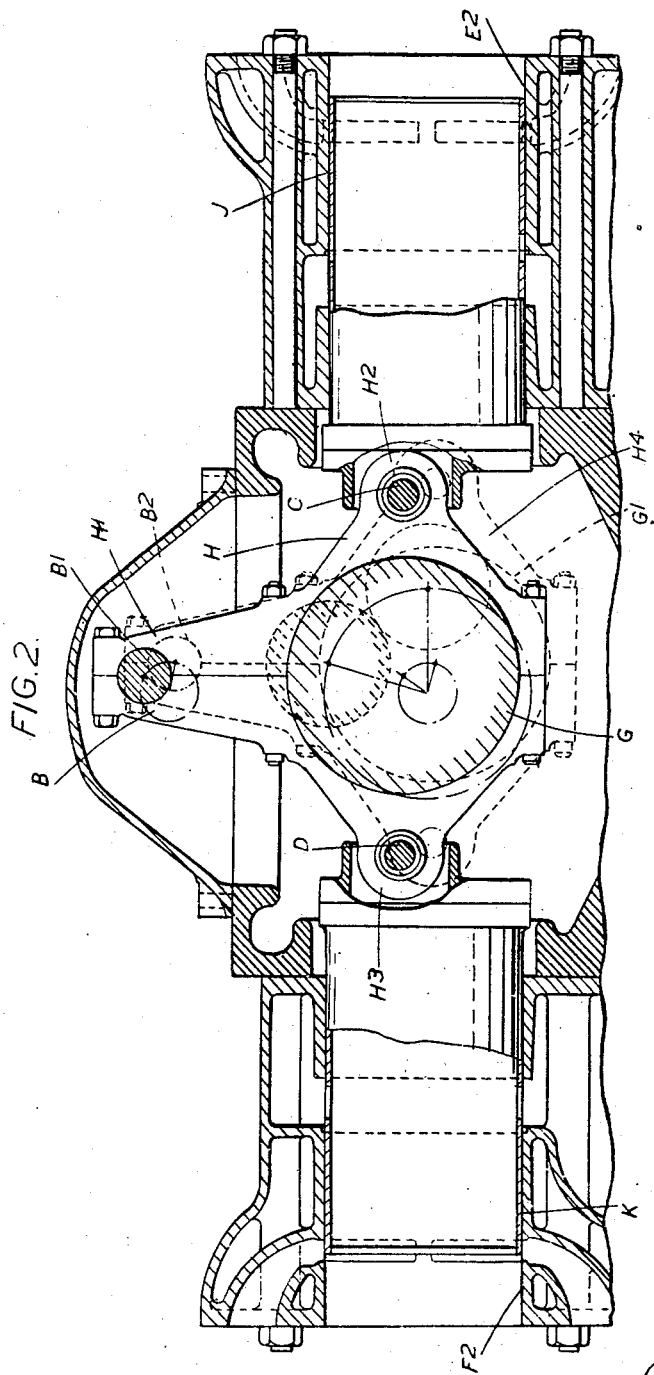

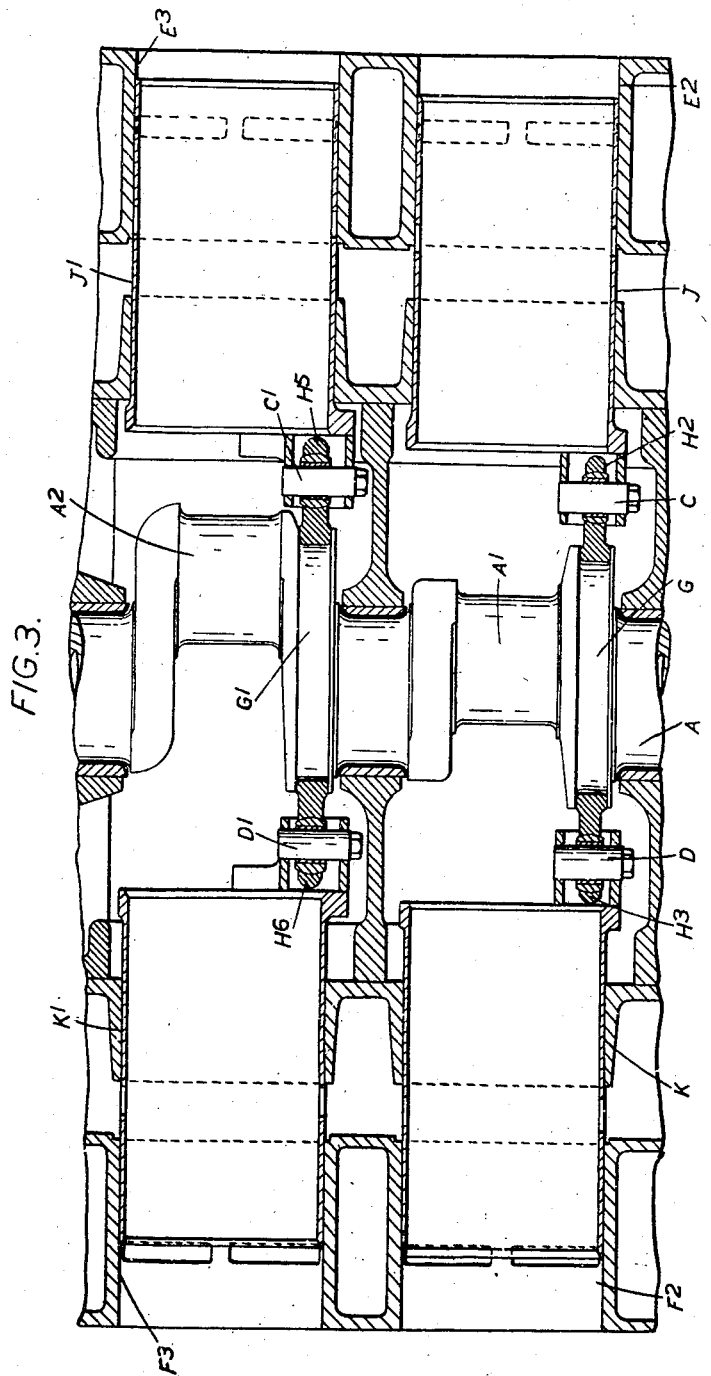

Patented Jan. 23, 1945

2,367,963

UNITED STATES PATENT OFFICE 2,367,963

TWO-CYCLE SLEEVE-VALVE ENGINE

Harry Ralph Ricardo, London, England

Application June 11, 1943, Serial No. 490,494
In Great Britain July 22, 1942

3 Claims. (Cl. 123—56)

This invention relates to an internal combustion engine operating on the two-stroke cycle and of the type provided with a single oscillating sleeve valve in each cylinder which is operated at the same speed as the engine crankshaft. The object of the invention is to improve the means by which the valve of such an engine is driven.

According to this invention cranks on the engine crankshaft actuate one or more sleeve valves through at least one pair of members which impart uniform angular velocity to each sleeve-operating member in two planes normal to the crankshaft axis. Each valve-actuating member which is driven directly by a crank on the engine crankshaft drives also a secondary crankshaft which in turn may operate one or more auxiliary mechanisms. These valve-actuating members constitute in effect coupling rods between cranks on the engine crankshaft and cranks on the secondary crankshaft and since the angular velocity of the whole of each member is uniform they impart a drive at constant angular velocity to the operating member of each sleeve valve. This mechanism for operating the sleeve valves is particularly applicable to an engine operating on the two-stroke cycle having two single acting cylinders the pistons in which are coupled to one crank pin, the cylinders being disposed for example horizontally, with their axes at 180° about the crankshaft axis. It is also more especially suitable for use with sleeve valves of the open-ended type in which the exhaust takes place over the end of the sleeve instead of through ports in its wall.

In practice it is convenient to employ eccentrics as the driving cranks on the engine crankshaft, with each eccentric strap formed as a driving plate or coupling rod with an arm extending into a suitable position where it engages a crank on the secondary shaft which has a throw equal to the eccentricity of the driving eccentric. By this means the secondary shaft is driven in phase with the engine crankshaft and the driving plate constitutes a coupling rod not only between the two crankshafts but also between these shafts and the operating pins or other members of the sleeve valves so that the whole rotates with uniform angular velocity.

The connection with each sleeve valve may be by means of suitably formed arms or lugs projecting from the main part of the driving plate, these projections being arranged as may be convenient in accordance with the respective positions of the sleeve operating pins, since it is immaterial where these pins may be disposed in relation to the main driving eccentrics. If the engine has two or more main crank-throws it is unnecessary to provide any driving or phase retiming gearing between the main and secondary crankshafts.

The accompanying drawings illustrate by way of example a construction in which the invention is embodied. In these drawings—

Figure 1 is a diagrammatic view showing the invention as applied to an internal combustion engine of the type having horizontally opposed cylinders, the view being taken from the end of the main crankshaft and showing the engine cylinders and the sleeve valves therein as in longitudinal section.

Figure 2 is a sectional elevation of a construction looking in the direction of the crankshaft axis and showing the opposed cylinders in longitudinal section.

Figure 3 is a sectional plan in which are seen two pairs of opposed cylinders and a pair of coupling rods actuating the sleeve valves in these cylinders.

Referring to Figure 1, this shows one of the driving plates which functions as a coupling rod between the main crankshaft A, the secondary crankshaft B, and the driving pins C and D of the sleeve valves in the two opposed cylinders. The crank pin $A^1$ is connected by the rods E and F to the pistons $E^1$ and $F^1$ in the opposed cylinders $E^2$ and $F^2$. On the shaft A is an eccentric G which imparts oscillation to the driving plate or coupling rod member H. As will be seen this is shaped somewhat as an inverted T with one arm $H^1$ directed upwardly and the shorter arms $H^2$ and $H^3$ extending laterally and oppositely. The arm $H^1$ engages the pin $B^1$ on the secondary crankshaft B which is thus driven at uniform velocity from the main crankshaft A. The sleeve valves J and K respectively in the cylinders $E^2$ and $F^2$ are driven through the coupling rod member H whose arm $H^2$ engages the operating pin C of the sleeve $E^2$ while the arm $H^3$ engages the operating pin D of the sleeve valve $F^2$.

The arrangement as thus shown diagrammatically in Figure 1 is carried into effect in the construction shown in Figures 2 and 3. In practice it is essential that there be at least one pair of eccentrics and a corresponding pair of driving plates through which the drive is transmitted from the main crankshaft A to the secondary crankshaft B and to the sleeve valves. The one driving plate H is seen in Figure 2 and the second one $H^4$ is there indicated in dotted lines. The arms $H^1$, $H^2$ and $H^3$ of the driving plate H are seen as engaging respectively the crank pin $B^1$ of the secondary crankshaft B, and the operating pins C and D of the sleeve valves J and K in the cylinders $E^2$ and $F^2$. It will be seen in Figure 2 that the driving plate or coupling rod H is formed from the two halves of the strap of the eccentric G which are bolted together around that eccentric and also around the pin $B^1$ of the secondary crankshaft B. The arms $H^2$ and $H^3$ are constituted by lugs projecting from the two halves of the eccentric strap. The manner of engagement between these arms and the operating pins of the valves is in some known way which permits of the combined reciprocating and oscillating movements imparted to the sleeve valves.

In Figure 3 there can be seen the disposition of the pair of eccentrics G and $G^1$ which are necessary to transmit the drive through the two coupling rods to the secondary crankshaft. The lateral arms $H^5$ and $H^6$ of the second coupling rod member $H^4$ are shown as engaging the operating pins $C^1$ and $D^1$ of the sleeve valves $J^1$ and $K^1$ in a second pair of oppositely disposed cylinders $E^3$ and $F^3$ the pistons in which act on the crank pin $A^2$. If the engine has not a second pair of cylinders then the second driving plate need not be formed with lateral arms or lugs since it merely serves as a second coupling rod between the main crankshaft A and crank pins $B^1$ and $B^2$ on the secondary shaft B. It may be noted that in any case the crank pins of the secondary shaft which are coupled to a pair of eccentrics on the main shaft are set at 90° to each other or at some other suitable angle, the eccentrics being similarly arranged on the main shaft. Provided there is at least one pair of coupling rod members, then for every additional pair of oppositely arranged cylinders only one further coupling rod need be used. As shown in Figure 3 the one pair of coupling rods serves for transmitting the drive to two pairs of cylinders, but a similar pair of coupling rods would be necessary if the engine had only one pair of cylinders whether these be disposed oppositely or otherwise as for instance in V-form. Even if the engine has only one cylinder, the sleeve valve may be operated by such a coupling rod with arms connecting the main crankshaft to the secondary crankshaft and to the valve operating pin, but a second coupling rod would be necessary between a second eccentric on the main shaft and a second crank pin on the secondary shaft, this crank pin being set at approximately 90° to the crank pin of the first coupling rod member.

The power transmitted by these plates to the secondary crankshaft can be utilised for the driving of such auxiliary mechanisms as a scavenge pump or blower which can be driven direct and without the interposition of gearing.

Where the sleeve valves driven by the improved means are of the type mentioned in which the exhaust gas passes over the end of the sleeve and not through ports in its wall, each sleeve is exposed to the full gas pressure in the cylinder and forms in effect an annular piston of substantial total area around the main piston. Consequently the sleeve operating mechanism is subjected no only to inertia forces, the weight of these valves being considerable, but also to the effect of great gas pressure. When, however, two cylinders are opposed and the sleeve valves of both cylinders are connected to one and the same driving plate or coupling member which is operated by a single eccentric, it follows that the gas pressure when exerted on the one sleeve is partially balanced by the inertia of the sleeve of the opposite cylinder and the bearings of the eccentric are subject only to the difference between these two opposing forces.

The detail construction of the driving plate member may vary in accordance with the desired relative disposition of the secondary crankshaft and the sleeve valve operating pins and of all these in relation to the main crankshaft.

What I claim as my invention and desire to secure by Letters Patent is:

1. An internal combustion engine operating on the two-stroke cycle comprising in combination a main crankshaft, at least one pair of cylinders oppositely disposed with respect to the said crankshaft, a single sleeve valve in each of such cylinders, a secondary crankshaft parallel to the main crankshaft, at least one pair of coupling rods extending between cranks on the main shaft and cranks on the secondary shaft through which rotation is imparted to the secondary crankshaft from the main crankshaft, and an operative connection between at least one of the said coupling rods and the sleeve valve in each of the said cylinders.

2. An internal combustion engine operating on the two-stroke cycle comprising in combination a main crankshaft, at least one pair of cylinders oppositely disposed with respect to the said crankshaft, a single sleeve in each of such cylinders adapted to receive both oscillating and reciprocating movement in the cylinder through an operating pin, a secondary crankshaft parallel to the main crankshaft, at least one pair of coupling rods extending between cranks on the main shaft and cranks on the secondary shaft through which rotation is imparted to the secondary crankshaft from the main crankshaft, and an operative connection between at least one of the said coupling rods and the operating pin of each sleeve valve.

3. An internal combustion engine operating on the two-stroke cycle comprising in combination a main crankshaft, at least one pair of cylinders oppositely disposed with respect to the said crankshaft, a single sleeve valve in each of such cylinders, a secondary crankshaft parallel to the main crankshaft, at least one pair of coupling rods of which at least one has a T-form with a central main part and lateral arms, these rods extending between cranks on the main and secondary crankshafts, and an operative connection between each lateral arm of at least one of the said coupling rods and the sleeve valve in one of the cylinders in the said pair.

HARRY RALPH RICARDO.